United States Patent
Mrozowski et al.

(10) Patent No.: US 6,431,638 B1
(45) Date of Patent: Aug. 13, 2002

(54) AUTOMOBILE LIFT GATE

(75) Inventors: Joseph E. Mrozowski, Clarkston; John P. Pacella, Rochester Hills, both of MI (US)

(73) Assignee: The Budd Company, Troy, MI (US)

( * ) Notice: Subject to any disclaimer, the term of this patent is extended or adjusted under 35 U.S.C. 154(b) by 0 days.

(21) Appl. No.: 09/709,755

(22) Filed: Nov. 9, 2000

Related U.S. Application Data

(60) Provisional application No. 60/165,602, filed on Nov. 15, 1999.

(51) Int. Cl.[7] .................................................. B60J 5/02
(52) U.S. Cl. .............................. 296/146.8; 296/146.1; 296/146.2; 296/146.7; 296/50
(58) Field of Search .......................... 296/146.8, 50, 296/146.1, 149, 152, 146.2, 146.3, 146.7, 76

(56) References Cited

U.S. PATENT DOCUMENTS

| | | | |
|---|---|---|---|
| 4,051,383 A | | 9/1977 | Dola |
| 4,065,199 A | | 12/1977 | Andre et al. |
| 4,122,357 A | | 10/1978 | Sumida |
| 4,143,904 A | * | 3/1979 | Cooper et al. ............... 296/57 |
| 4,184,709 A | * | 1/1980 | Kim ........................... 296/146 |
| 4,413,854 A | * | 11/1983 | Hirshberg ................... 296/146 |
| 4,799,730 A | * | 1/1989 | Harasaki ..................... 296/146 |
| 4,800,648 A | * | 1/1989 | Nakayama et al. ......... 296/146 |
| 4,822,098 A | * | 4/1989 | Vogt et al. .................. 296/901 |
| 4,823,507 A | * | 4/1989 | Miller ........................... 49/227 |
| 4,824,164 A | * | 4/1989 | Nakayama et al. ......... 296/146 |
| 4,831,278 A | | 5/1989 | Ueda et al. |
| 4,848,829 A | | 7/1989 | Kidd |
| 4,869,670 A | * | 9/1989 | Ueda et al. ................. 296/146 |
| 4,907,836 A | * | 3/1990 | Ueda et al. ................. 296/146 |
| 4,908,740 A | | 3/1990 | Hudgins et al. |
| 5,016,934 A | | 5/1991 | Pelz |
| 5,309,634 A | | 5/1994 | Van Order et al. |
| 5,442,518 A | | 8/1995 | Beam |
| 5,460,530 A | | 10/1995 | Toba et al. |
| 5,531,498 A | * | 7/1996 | Kowall ...................... 296/146.4 |
| 5,735,041 A | | 4/1998 | Zaguskin et al. |
| 5,744,218 A | | 4/1998 | Barnes |
| 5,768,092 A | | 6/1998 | Nishitani |
| 5,805,402 A | | 9/1998 | Maue et al. |
| 5,806,917 A | * | 9/1998 | Townsend ................. 296/146.5 |
| 5,811,732 A | | 9/1998 | Beam |
| 5,846,091 A | | 12/1998 | Nishijima et al. |
| 5,856,908 A | | 1/1999 | Takiguchi et al. |
| 5,879,407 A | * | 3/1999 | Yamaguchi et al. ..... 296/146.7 |
| 5,895,889 A | | 4/1999 | Uchida et al. |
| 5,909,012 A | | 6/1999 | Todd et al. |

(List continued on next page.)

FOREIGN PATENT DOCUMENTS

| | | | |
|---|---|---|---|
| JP | 63 38050 | * | 2/1988 |
| JP | 4 191124 | * | 7/1992 |
| JP | 5 4520 | * | 1/1993 |
| JP | 10 258711 | * | 9/1998 |

*Primary Examiner*—Ken Patel
(74) *Attorney, Agent, or Firm*—Harness, Dickey & Pierce, P.L.C.

(57) ABSTRACT

A closure assembly for a vehicle includes an outer panel and an inner panel. The outer panel has an exterior surface and an opposed bonding surface. The inner panel has an interior surface and an opposed mounting surface The mounting surface of the inner panel and the bonding surface of the outer panel are coupled at their periphery to form a shell. The shell defines a pocket. An electrical device may be positioned within the pocket and coupled to one of the inner and outer panels In one embodiment, a majority of the interior surface of the inner panel is exposed to the passenger compartment. In another embodiment, the inner panel includes an integrally molded wire to conduct electricity to the electrical device.

10 Claims, 3 Drawing Sheets

U.S. PATENT DOCUMENTS

| | | |
|---|---|---|
| 5,917,152 A | 6/1999 | Kameyama |
| 5,918,365 A | 7/1999 | Uchida et al. |
| 5,921,782 A | 7/1999 | Yamaguchi et al. |
| 5,936,818 A | 8/1999 | Maue et al. |
| 5,982,126 A * | 11/1999 | Hellinga et al. ............. 318/468 |
| 6,019,418 A * | 2/2000 | Emerling et al. ......... 296/146.8 |
| 6,203,094 B1 * | 3/2001 | Lee .......................... 296/146.2 |
| 6,234,564 B1 * | 5/2001 | Kim ......................... 296/146.8 |

\* cited by examiner

AUTOMOBILE LIFT GATE

RELATED APPLICATION

This application claims the benefit of U.S. Provisional Patent Application Ser. No. 60/165,602, filed Nov. 15, 1999.

BACKGROUND OF THE INVENTION

1. Technical Field

The present invention generally relates to motor vehicles and, more particularly, to a simplified lift gate.

2. Discussion

Many of today's motor vehicles are equipped with lift gates or hatches for providing access to the passenger compartment of the vehicle. Commonly, the lift gate includes a shell constructed from an outer panel and a support panel interconnected at their periphery. In addition, the lift gate includes either a fixed or pivotable glass panel for viewing objects located behind the vehicle. Recently, it has become desirable to locate electrical devices such as power locks, release mechanisms and wiper motors within the lift gate to assist the vehicle operator. Accordingly, provisions must be made to mount the electrical devices and subsequently conceal them from view. One or more interior trim panels are often used to cover the lift gate electrical devices and provide aesthetically pleasing surfaces which may be color coded to match other interior components.

Unfortunately, the use of the outer panel, support panel and interior trim panels creates a costly and undesirably complex lift gate. For example, after the support panel and outer panel are interconnected, a plurality of fasteners are inserted into the trim panels for coupling the interior trim panels to the support panel.

In addition, the use of electrical devices within the lift gate has created a need to route wiring from the electrical devices to the vehicle power source. As the number of electrical devices has increased, the task of aesthetically routing wiring harnesses has become increasingly difficult. Accordingly, a need exists for a simplified lift gate which reduces the cost and time associated with assembling a vehicle lift gate with electrical devices.

SUMMARY OF THE INVENTION

The present invention relates to a closure assembly for a vehicle. The closure assembly includes an outer panel and an inner panel. The outer panel has an exterior surface and an opposed bonding surface. The inner panel has an interior surface and an opposed mounting surface The mounting surface of the inner panel and the bonding surface of the outer panel are coupled at their periphery to form a shell. The shell defines a pocket. An electrical device may be positioned within the pocket and coupled to one of the inner and outer panels In one embodiment, a majority of the interior surface of the inner panel is exposed to the passenger compartment. In another embodiment, the inner panel includes an integrally molded wire to conduct electricity to the electrical device.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
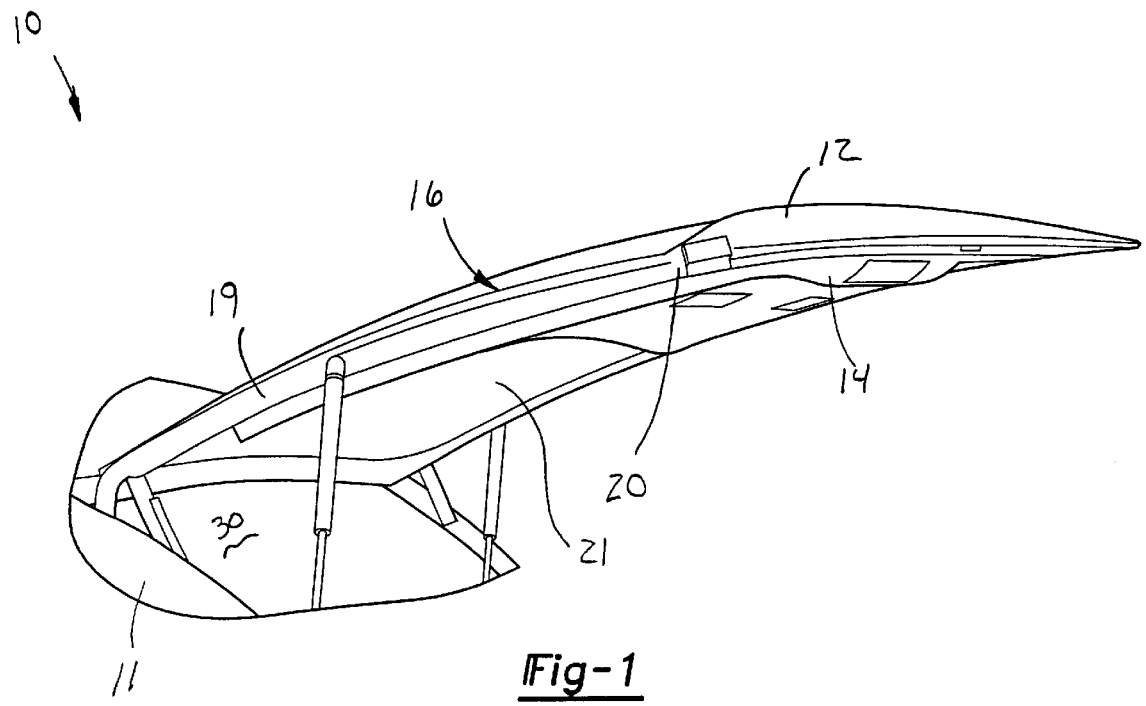
FIG. 1 is a perspective view of an embodiment of a lift gate of the present invention.
Figure 2:
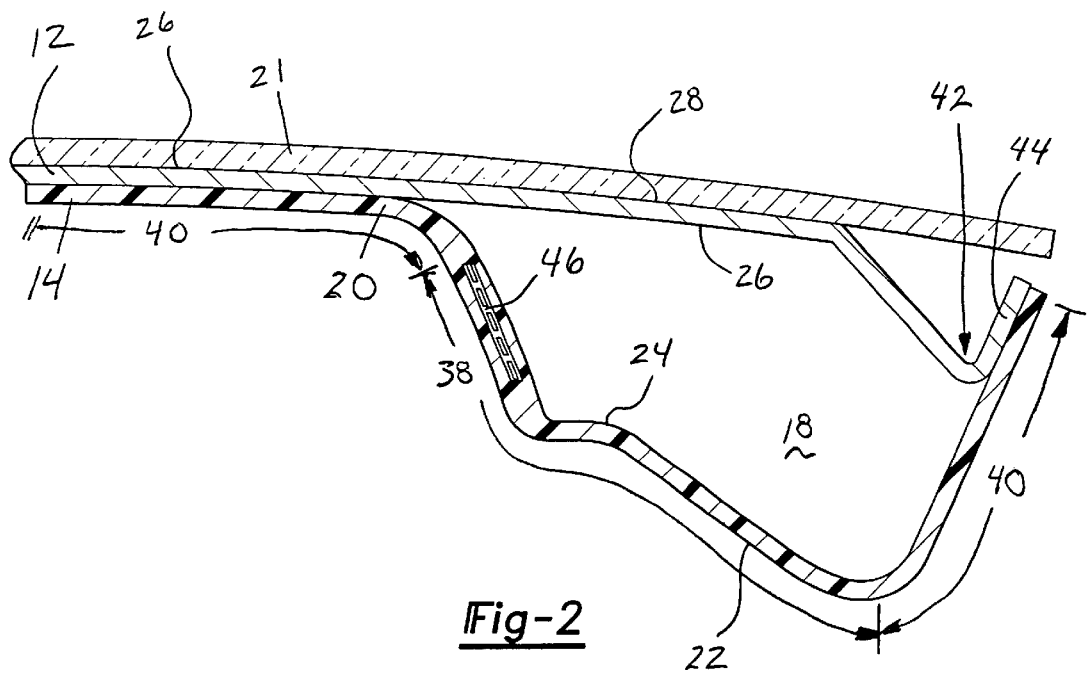
FIG. 2 is a partial cross-sectional view of an embodiment of a lift gate of the present invention.

With reference to FIGS. 1 and 2, a closure assembly constructed in accordance with the teachings of an embodiment of the present invention is generally identified at reference numeral 10. Closure assembly or lift gate 10 is operatively associated with an exemplary motor vehicle 11. The lift gate 10 is illustrated to generally include an outer panel 12 and an inner panel 14 interconnected at their periphery to form a shell 16 defining a hollow cavity 18 (FIG. 2) and a window frame 19. A window reinforcement 20 extends laterally across vehicle 11 separating hollow cavity 18 and window frame 19. A glass panel 21 is coupled to window frame 19.

Figure 3:
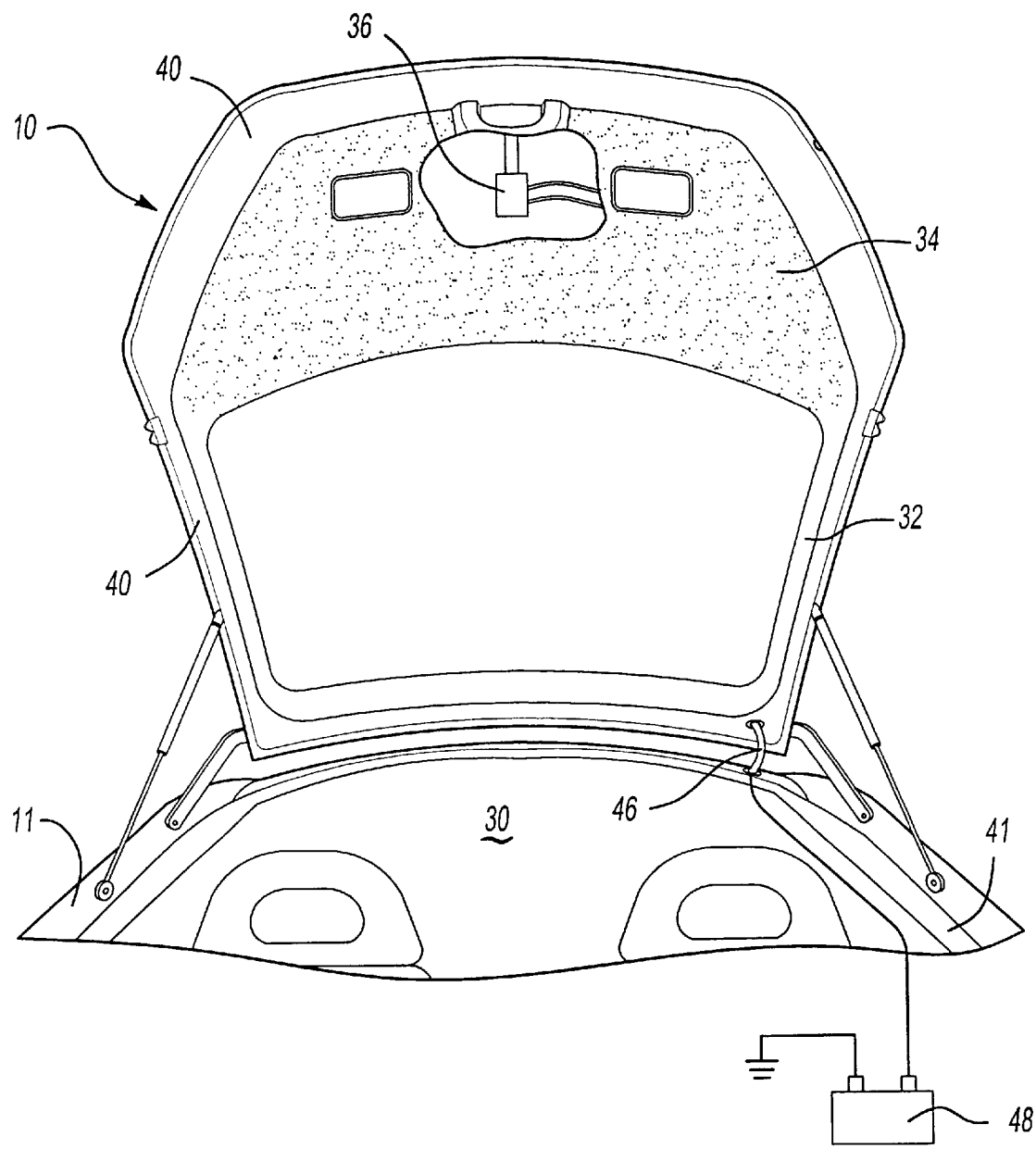
FIG. 3 is a perspective view of an embodiment of a lift gate of the present invention.

Inner panel 14 includes a first surface 22 and a second surface 24. Outer panel 12 includes a first surface 26 and a second surface 28. First surface 22 is exposed to a passenger compartment 30 of vehicle 11. The outer periphery of second surface 24 is coupled to first surface 26 of outer panel 12 via a method commonly known in the art such as adhesive bonding. As shown in FIGS. 2 and 3, inner panel 14 also includes a frame portion 32 and a cover portion 34. Frame portion 32 is shaped to compliment outer panel 12 and provide structural rigidity to lift gate 10. Cover portion 34 is shaped to form hollow cavity 18 thereby providing space to house electrical components such as a latch release solenoid 36 or a wiper motor, (not shown). It should be appreciated that inner panel 14 is preferably constructed from sheet molded compound (SMC) for providing a combination of high structural integrity and moldability. As such, cover portion 34 may be molded into a variety of shapes and sizes to accommodate specific vehicle and electrical component geometry.

Additionally, because inner panel 14 is a molded component, first surface 22 may be textured in a variety of ways to accomplish the design objective of trim panel elimination. Specifically, a section 38 of first surface 22 is preferably molded with a grained surface texture to match or compliment the interior of the vehicle. A section 40 of first surface 22 is preferably molded with a smooth texture to provide a sealing surface when the lift gate 10 is in a closed position. A seal 41 is coupled to vehicle 11. Seal 41 sealingly engages section 40 when lift gate 10 is in the closed position. It should be appreciated that seal 41 may be alternatively coupled to lift gate 10 without departing from the scope of the present invention.

Outer panel 12 is formed slightly convex in shape terminating at a trough 42. Trough 42 extends substantially about the perimeter of lift gate 10 and includes an upturned flange 44 coupled to the periphery of inner panel 14. Outer panel 12 is preferably constructed from a mild sheet steel commonly used for exterior body panels. One skilled in the art will appreciate that the outer panel may also be constructed from a composite material without departing from the scope of the present invention.

A first embodiment of a lift gate wiring harness is depicted at numeral 46 (FIG. 2). Lift gate wiring harness 46 is integrally molded with inner panel 14 thereby creating a pre-packaged and protected electrical conduction path for interconnecting an electrical lift gate device and a vehicle power source 48. Specifically, the preferred method of producing the wiring harness 46 is to initially arrange pre-molded SMC pieces in cooperation with conductors 49 to form a charge (not shown). The charge is then placed in the forming die where heat and pressure are applied to transform the SMC to a liquid. The liquid flows to fill the cavities of the mold and the inner panel 14 is cured. After curing, inner panel 14 with imbedded wiring harness 46 is ready for paint or final installation. It should be appreciated that one or more conductive paths may be embedded within inner panel 14 such that a circuit is formed for providing power to a variety of locations about inner panel 14. It should further be appreciated that the concern regarding the packaging of wiring harnesses is alleviated thereby allowing a designer to reduce the size of cover portion 34 and package only the electrical devices themselves.

Figure 4:
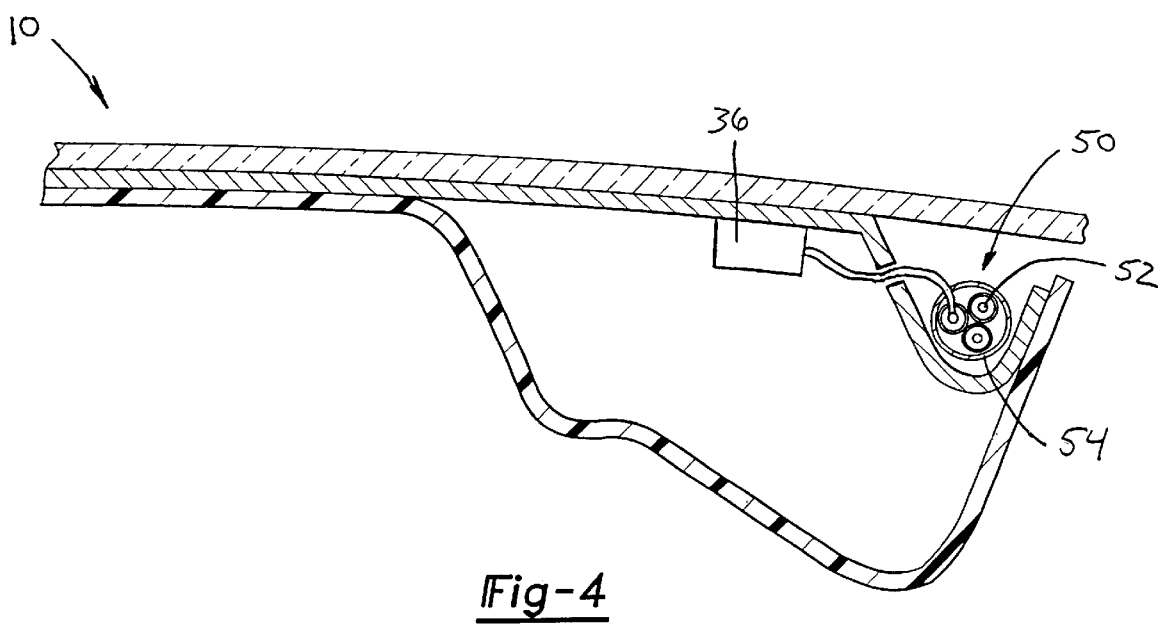
FIG. 4 is a partial cross-sectional view of another embodiment of the present invention.

Referring to FIG. 4, a second embodiment of the lift gate wiring harness is generally depicted at reference numeral 50. The second embodiment of the lift gate wiring harness 50 preferably includes a bundled set of conductors 52 disposed in a conduit 54. It should be appreciated that conduit 54 provides a simple means of grouping conductors 52 for routing within lift gate 10 while protecting the conductors from damage.

In the preferred method of assembly, wiring harness 50 is disposed within trough 42 of outer panel 12 prior to installation of glass panel 21. It should be appreciated that glass panel 21 is attached to outer panel 12 in a manner commonly known in the art such as adhesive bonding.

It should be appreciated that other vehicle closure assemblies constructed in accordance with the teachings of the present invention, such as doors, hoods and lids, are contemplated. Depending on the vehicle, it may be advantageous to implement the vehicle with more than one closure as defined in the following claims.

From the foregoing discussion it should be appreciated that the present invention provides a simple and economically advantageous method of constructing a closure assembly. Specifically, the inner panel of the present invention combines structural stability and aesthetic appeal thereby reducing the number of components required to construct the closure. In one embodiment, the inner panel includes an integral electrical circuit for interconnecting a variety of electrical devices to the vehicle power source. In another embodiment, the outer panel is formed to conveniently and securely route a wiring harness within an internal cavity of a lift gate thereby reducing packaging concerns and intrusion of the inner panel into the passenger compartment.

What is claimed is:

1. A lift gate for a vehicle having a body defining a passenger compartment, the lift gate comprising:

an outer panel having an exterior surface and an opposed bonding surface;

an inner panel having an interior surface and an opposed mounting surface, wherein said mounting surface of said inner panel and said bonding surface of said outer panel are coupled at their periphery to form a shell, said inner panel and said outer panel defining a substantially hollow pocket therebetween; and an electrical device positioned within said pocket and coupled to one of said inner and outer panels, wherein a majority of said interior surface of said inner panel is exposed to the passenger compartment.

2. The lift gate of claim 1 wherein said interior surface includes a sealing portion, said sealing portion adapted to selectively engage a seal positioned between said lift gate and the body.

3. The lift gate of claim 2 wherein said interior surface includes a trim portion, wherein said sealing portion has a substantially smooth surface finish and said trim portion has a textured surface finish.

4. The lift gate of claim 1 further including a glass panel, wherein said outer panel defines a window frame to receive said glass panel.

5. The lift gate of claim 1 wherein said inner panel includes an embedded wire to conduct electricity to said electrical device.

6. The lift gate of claim 1 wherein said outer panel includes a trough formed substantially about its periphery.

7. A lift gate for a vehicle having a body defining a passenger compartment, the lift gate comprising:

an outer panel having an exterior surface and an opposed bonding surface;

an inner panel having an interior surface and an opposed mounting surface, wherein said mounting surface of said inner panel and said bonding surface of said outer panel are coupled at their periphery to form a shell, said shell defining a pocket, wherein said outer panel is formed to include a trough having an upturned flange along a portion of Its periphery; and a glass panel coupled to said exterior surface of said outer panel, wherein said glass panel covers at least a portion of said trough.

8. The lift gate of claim 7 wherein said interior surface of said inner panel is visible from the passenger compartment.

9. The lift gate of claim 8 wherein said interior surface includes a sealing portion, said sealing portion adapted to selectively engage a seal positioned between said lift gate and the body.

10. The lift gate of claim 9 wherein said interior surface includes a trim portion, wherein said sealing portion has a substantially smooth surface finish and said trim portion has a textured surface finish.

* * * * *